July 9, 1946.  G. E. DATH  2,403,584
FRICTION SHOCK ABSORBER
Filed Feb. 7, 1944
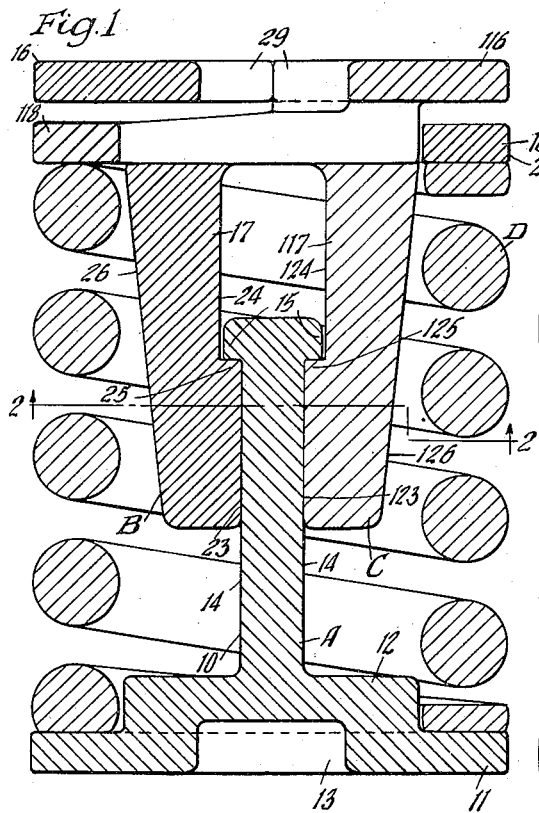
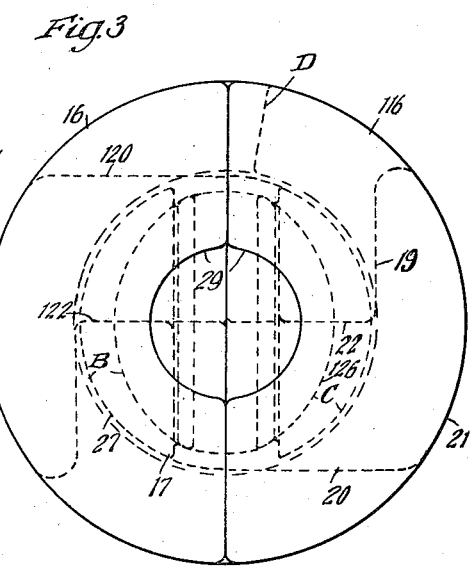
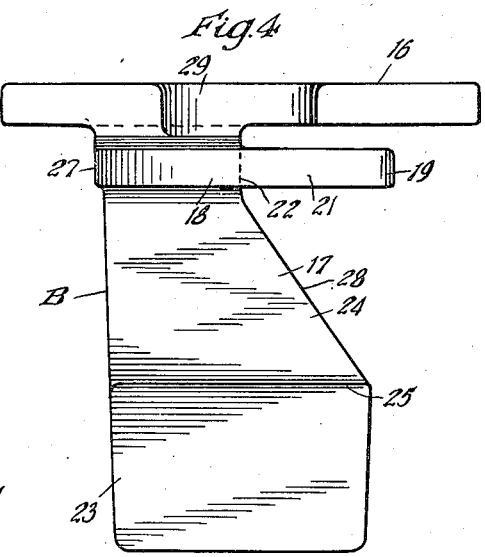
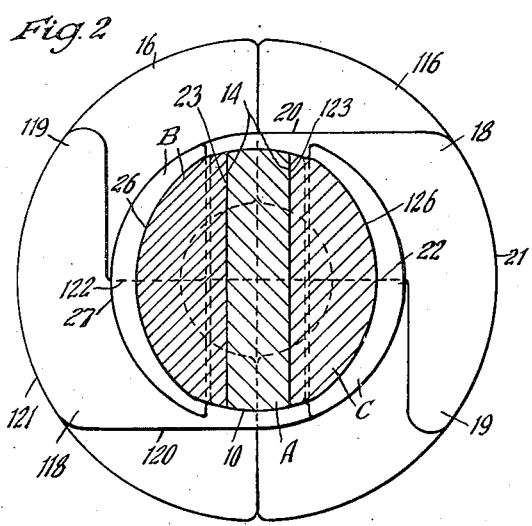
Inventor
George E. Dath
By Henry Fuchs
Atty.

Patented July 9, 1946

2,403,584

UNITED STATES PATENT OFFICE 2,403,584

FRICTION SHOCK ABSORBER

George E. Dath, Chicago, Ill., assignor to W. H. Miner, Inc., Chicago, Ill., a corporation of Delaware Application February 7, 1944, Serial No. 521,329

7 Claims. (Cl. 267—9)

This invention relates to improvements in friction shock absorbers, especially adapted for use with truck springs of railway cars for snubbing or dampening the action of the springs.

One object of the invention is to provide a friction shock absorber comprising a friction post; a pair of rockable friction shoes having sliding engagement with the post; and spring resistance means surrounding the post and shoes and opposing relative lengthwise movement of the same, wherein the spring resistance also presses the shoes into tight frictional contact with the post.

A more specific object of the invention is to provide a mechanism, as specified in the preceding paragraph, wherein the friction shoes are provided with laterally projecting flanges forming relatively long lever arms on which the spring resistance bears to rock the shoes toward the post.

Other objects of the invention will more clearly appear from the description and claims hereinafter following.

In the drawing forming a part of this specification, Figure 1 is a central transverse vertical sectional view of my improved friction shock absorber. Figure 2 is a transverse horizontal sectional view, corresponding substantially to the line 2—2 of Figure 1. Figure 3 is a top plan view of Figure 1. Figure 4 is an elevational view of one of the friction shoes of the device, looking from right to left in Figure 1, and showing the shoe at the left hand side of said figure.

As shown in the drawing, my improved shock absorber comprises broadly a friction post A; two friction shoes B and C; and a spring resistance D.

The friction post comprises a relatively wide, heavy platelike portion 10, which forms the post member proper, having a laterally projecting, annular flange 11 at the lower end, which is in the form of a heavy disc, having an upwardly offset, central portion 12, which is formed with a central seat or recess 13, adapted to accommodate the usual spring centering projection of the bottom spring plate of the truck spring cluster of the railway car. The post member proper 10 upstands from the disclike portion 11 and is provided with substantially flat friction surfaces 14—14 on opposite sides thereof, which are preferably parallel to the longitudinal, central axis of the mechanism. At the upper end, the post is provided with laterally outwardly projecting, heavy flanges 15—15 at the friction surface sides thereof, forming, in effect, a head member presenting downwardly facing, horizontal stop shoulders.

The two friction shoes B and C are identical in design. Referring first to the shoe B, the same comprises a substantially semi-circular, flat, platelike follower portion 16 and an arm 17 depending from said follower portion. At the upper end of the arm 17, immediately below the follower portion 16 and downwardly offset therefrom, is a laterally extending, horizontally disposed, platelike flange 18. The flange 18 projects from the inner side of the shoe B and is broadly of L-shaped outline, in plan, having a right angularly projecting, outer end portion 19 and a straight portion 20 connecting said portion 19 to the arm 17. The outer edge of the flange 18 is rounded, as indicated at 21, said rounded edge being concentric to and in vertical alignment with the outer edge of the platelike follower of the shoe C. The inner edge of the straight portion 20 of the flange 18, which edge is indicated by 22, is substantially straight and extends radially from the vertical central axis of the mechanism, at right angles to the diametrical side edge of the platelike follower 16. The flange 18, in effect, forms an offset continuation of the follower 16 and provides a lever arm on said follower for rocking the shoe toward the post A.

At the outer or lower end portion thereof, the arm 17 of the shoe B presents a longitudinally, substantially flat, friction surface 23, which is vertically disposed and engages the corresponding friction surface 14 of the post A. The inner side of the arm 17 of the shoe B is cut away, inwardly of the friction surface, as indicated at 24, thereby presenting a horizontally disposed stop shoulder 25, adapted to engage beneath the flange 15 at the corresponding side of the post A to limit longitudinal separation of the post and shoe. The outer side of the shoe is inclined upwardly and outwardly and the surface of said outer side is transversely curved. The outer side thus presents a conical surface 26, which merges with the outer surface 27 of the upper end portion of the shoe, which outer surface 27 is substantially cylindrical.

Referring to the friction shoe C, which as hereinbefore stated is identical with the shoe B, the platelike follower is indicated by 116, the depending arm by 117, the flange by 118, the right angular end and the straight portions of the flange 118 by 119 and 120, respectively, the rounded outer edge of the end 119 by 121, the straight inner edge of the portion 120 by 122, the friction surface of the arm 117 by 123, the cut away portion of the arm 117 by 124, the stop shoulder by 125, and the outer conical surface of the shoe C by 126.

The friction shoes B and C are disposed on opposite sides of the post A with the friction surfaces 23 and 123 thereof engaging the friction surfaces 14—14 of the post, the shoe B being disposed at the left hand side and the shoe C at the right hand side of the post, as seen in Figure 1. The platelike followers 16 and 116 of the shoes B and C are in abutment with each other along their diametrical inner edges, and the straight inner edges 22 and 122 of the flanges 18 and 118 of said shoes are also in abutment with each other, the flange 18 of the shoe B being disposed at the right hand side, and the flange 118 of the shoe C at the left hand side of the mechanism, as seen in Figure 1, the flange 18 of the shoe B being below the follower 116 of the shoe C, and the flange 118 of the shoe C being below the follower 16 of the shoe B. To accommodate the straight portions 20 and 120 of the flanges 18 and 118 of the shoes B and C and also facilitate assembling of the parts of the mechanism, the arms or plate sections 17 and 117 of the shoes are cut away, the shoe B, as indicated at 28, and the shoe C, in a similar manner.

At the center of the mechanism, the plate like followers 16 and 116 of the two shoes B and C are provided with an upwardly opening seat to accommodate the usual spring centering projection or boss of the upper spring plate of the truck spring cluster, the followers 16 and 116 being recessed, as indicated at 29, to provide said seat.

The spring resistance D is in the form of a heavy coil surrounding the post and friction shoes and bears at its top and bottom ends, respectively, on the flanges or lever arms 18—118 of the shoes B and C and the annular flange 11 of the platelike portion or follower 10 of the post A.

The spring D is preferably under initial compression and holds the shoes against the friction surfaces of the post, due to the pressure exerted on the flanges or lever arms 18 and 118 thereof.

In assembling the parts of my improved friction shock absorber, the shoes B and C are first connected to each other by interengaging the platelike followers 16 and 116 thereof by sliding the same laterally toward each other along their diametrical inner edges. With the parts inverted with respect to the position shown in Figure 1, that is, with the followers of the shoes resting on a suitable support, the spring D is placed around the shoes, and the upper ends of the shoes are spread apart to admit the head of the post A therebetween. The post is then applied by inserting the same downwardly within the coil spring D and entering the same between the tilted shoes B and C. As the post A is forced downwardly, the spring D is compressed against the flanges or lever arms 18—118 of the shoes. The post is forced downwardly until the stop flanges 15—15 thereof are at a level below the shoulders 25 and 125 of the shoes, and engage underneath the same, thereby bringing the parts to the assembled position, as shown in Figure 1, with the exception that the shock absorber is in inverted position with respect to Figure 1.

Although the shock absorber has been illustrated in the drawing, with the post at the lower end and the shoes at the upper end thereof, it will be evident that the same may be used as a snubber either in the position shown, or bodily inverted, with the shoes arranged at the bottom and the post at the top.

My improved shock absorber is substituted for one or more of the coil spring units of a cluster of truck springs, the same being interposed between the top and bottom spring follower plates of said cluster.

The operation of the improved shock absorber is as follows: Upon the cluster of springs of a railway car truck being compressed between the spring follower plates of the truck springs, the shoes B and C and the friction post A are moved toward each other in lengthwise direction against the resistance of the spring D. Due to the initial compression of the spring, which bears on the lever arms 18 and 118 of the shoes, the shoes which fulcrum on the spring follower plates of the spring cluster are pressed against the post, thereby producing the desired frictional resistance. As the spring is compressed during operation of the mechanism, the pressure on the lever arms of the shoes increases, thus pressing the shoes against the friction surfaces of the post with increasing force, whereby the frictional resistance and snubbing of the shock absorber is progressively increased as compression of the mechanism progresses. The desired high frictional resistance is thus produced between the friction surfaces of the post and shoes to properly snub the action of the railway car truck springs. Compression of the mechanism is positively limited by engagement between the lower ends of the shoes B and C and the offset 12 of the disclike plate portion 10 of the post A. Upon the spring follower plates of the truck springs being moved apart, during recoil of the truck springs, the expansive action of the spring D restores all of the parts to the normal release position shown in Figure 1, separation of the post and shoes in lengthwise direction being limited by engagement of the stop flanges 15—15 of the post with the shoulders 25 and 125 of the shoes.

As will be evident, the frictional resistance provided by the shock absorber during restoration of the parts to normal position serves to also snub the action of the truck springs in recoil.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction post having longitudinally extending friction surfaces; of a pair of friction shoes embracing said post and having lengthwise sliding engagement with the friction surfaces thereof, each shoe having a follower member at the outer end thereof, said follower member being at one side of said shoe; a laterally projecting lever arm on the other side of said shoe; and spring means surrounding said post and shoes and opposing relative lengthwise movement thereof toward each other, said spring bearing on the lever arms of the shoes to tilt the same against said post.

2. In a friction shock absorbing mechanism, the combination with a friction post having longitudinally extending friction surfaces on opposite sides thereof; of a pair of friction shoes embracing said post at opposite sides, said shoes having longitudinally extending friction surfaces at their inner ends on the inner sides thereof engaging the friction surfaces of the post, each shoe having a follower member at the outer end thereof; a laterally projecting lever arm on each shoe projecting from the friction surface side thereof and extending beyond the other shoe; and spring means surrounding said post and opposing relative lengthwise movement thereof toward said shoes, said spring means bearing on the lever arms of the shoes to tilt the same against the post.

3. In a friction shock absorbing mechanism, the combination with a friction post having a follower plate member at one end thereof, said post having longitudinally extending friction surfaces at opposite sides thereof; of a pair of friction shoes embracing said post at opposite sides, said shoes having longitudinally extending friction surfaces at their inner ends on the inner sides thereof slidably engaging the friction surfaces of said post; a laterally, outwardly projecting follower flange on each shoe; a laterally extending lever arm on each shoe projecting from the friction surface side thereof, said arm being inwardy offset with respect to said follower flange; and a coil spring surrounding said shoes and post and bearing at opposite ends on the follower plate member of the post and the lever arms of the shoes.

4. In a friction shock absorbing mechanism, the combination with a vertically disposed friction post having a horizontally disposed follower plate member at one end thereof; of a pair of friction shoes embracing said post at opposite sides in lengthwise sliding engagement therewith, said shoes having friction surfaces on the inner sides thereof engaging said post; a horizontally disposed, laterally outwardly projecting follower flange at the outer end of each shoe; a horizontally disposed lever arm on each shoe extending from the friction surface side thereof, said lever arm being offset inwardly with respect to the flange of the shoe; and spring means opposing relative lengthwise movement of said post and shoes toward each other, said spring bearing at opposite ends on the follower plate member of the post and the lever arms of the shoes.

5. In a friction shock absorbing mechanism, the combination with a vertically disposed friction post having longitudinally extending friction surfaces; of a pair of friction shoes embracing said post and having lengthwise sliding engagement with the friction surfaces thereof, said shoes having follower portions at their outer ends; a laterally projecting, horizontal lever arm on each shoe; and spring means surrounding said post and shoes and opposing relative lengthwise movement thereof toward each other, said spring bearing on the lever arms of the shoes to tilt the same against said post.

6. In a friction shock absorbing mechanism, the combination with a vertically disposed friction post having longitudinally extending friction surfaces on opposite sides thereof; of a pair of vertically disposed friction shoes embracing said post at opposite sides, said shoes having longitudinally extending friction surfaces at their inner ends on the inner sides thereof engaging the friction surfaces of the post, said shoes having flat transverse outer ends; a horizontally, laterally projecting lever arm on each shoe projecting from the friction surface side thereof and extending beyond the other shoe; and spring means surrounding said post and opposing lengthwise movement of said post toward the shoes, said spring means bearing on the lever arms of the shoes to tilt the same against the post.

7. In a friction shock absorbing mechanism, the combination with a friction post having a circular, disclike follower plate member at one end thereof, said post having longitudinally extending friction surfaces at opposite sides thereof; of a pair of friction shoes embracing said post at opposite sides, said shoes having longitudinally extending friction surfaces at their inner ends on the inner sides thereof slidably engaging the friction surfaces of said post; a laterally, outwardly projecting, semi-circular follower plate on each shoe, at the outer end thereof, the follower plates of said shoes being in abutment on their diametrical inner edges; a laterally extending lever arm on each shoe projecting from the friction surface side thereof, said arm being inwardly offset with respect to said follower plate; and a coil spring surrounding said shoes and post and bearing at opposite ends on the follower plate member of the post and the lever arms of the shoes.

GEORGE E. DATH.